Aug. 24, 1954  V. S. DANIELSON ET AL  2,687,220
COMBINED FRICTION AND RUBBER SHOCK ABSORBING MECHANISM
Filed July 9, 1951
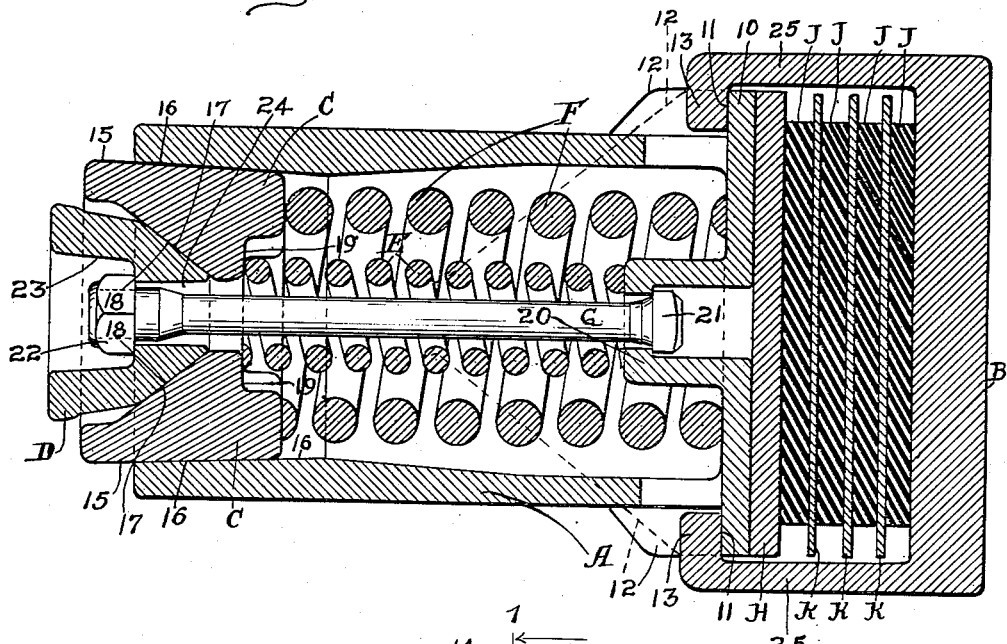
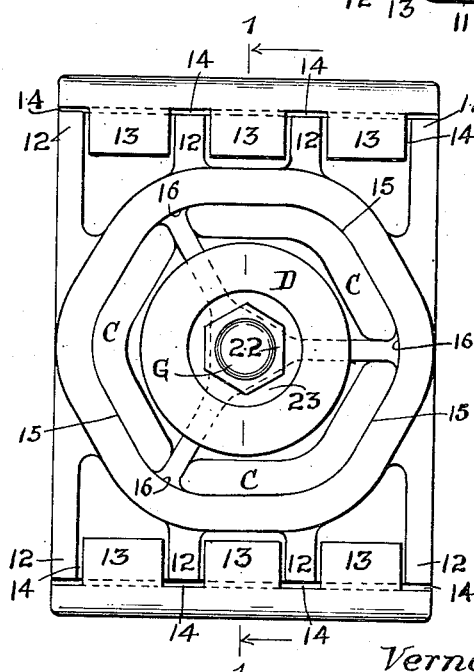
Inventors:
Vernon S. Danielson.
William D. Wallace.
By Henry Fuchs
Atty.

Aug. 24, 1954   V. S. DANIELSON ET AL   2,687,220
COMBINED FRICTION AND RUBBER SHOCK ABSORBING MECHANISM
Filed July 9, 1951   2 Sheets-Sheet 2

Inventors:
Vernon S. Danielson.
William D. Wallace.
By Henry Fuchs
Atty.

Patented Aug. 24, 1954

2,687,220

UNITED STATES PATENT OFFICE 2,687,220

COMBINED FRICTION AND RUBBER SHOCK ABSORBING MECHANISM

Vernon S. Danielson, Dolton, and William D. Wallace, Park Forest, Ill., assignors to W. H. Miner, Inc., Chicago, Ill., a corporation of Delaware Application July 9, 1951, Serial No. 235,755

2 Claims. (Cl. 213—34)

This invention relates to improvements in shock absorbing mechanisms for railway draft riggings.

One object of the invention is to provide a combined friction and rubber shock absorbing mechanism for railway cars, comprising a high capacity friction device and a cooperating rubber unit, wherein the resistance of the rubber cushioning unit is employed in series with the resistance of the friction device.

A further object of the invention is to provide a shock absorbing mechanism of the character indicated, comprising a friction casing, a friction clutch slidingly engaged within the casing and arranged to receive the actuating force from the usual front follower, a rear follower member movable lengthwise of the mechanism with respect to the casing, and a rubber cushioning unit interposed between the casing and follower member, the rubber cushioning unit being under initial compression between the casing and rear follower member, compressible therebetween in series with the friction device.

Another object of the invention is to provide a mechanism as set forth in the preceding paragraph, wherein the friction clutch includes shoes in frictional engagement with the interior walls of the casing, and a wedge engaging the shoes, the wedge being arranged to receive the actuating force from the front follower of the usual railway draft rigging, and projecting outwardly beyond the front end of the friction casing in the full release position of the parts of the mechanism, said wedge being movable inwardly of the casing during compression of the mechanism until the front follower directly engages the front end of the casing, whereby compression of the friction means is limited.

Other objects of the invention will more clearly appear from the description and claims hereinafter following.

Figure 3:
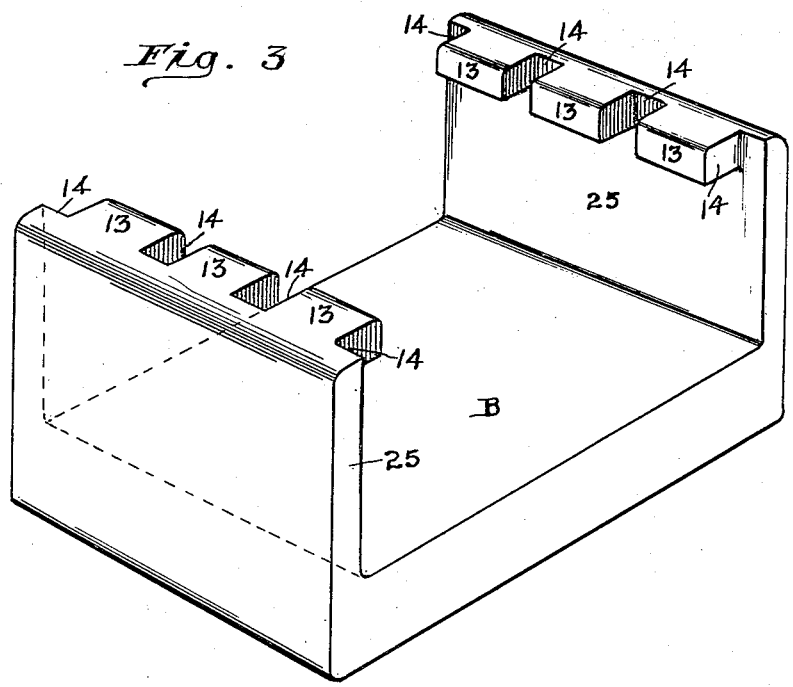
Figure 4:
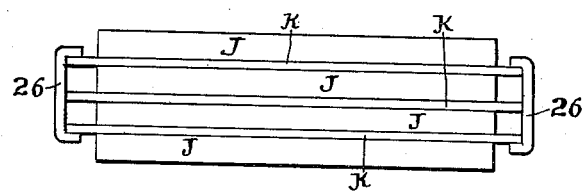

In the accompanying drawings forming a part of this specification, Figure 1 is a longitudinal vertical sectional view of our improved combined friction and rubber shock absorbing mechanism, corresponding substantially to the line I—I of Figure 2. Figure 2 is a front elevational view of Figure 1, looking from left to right in said figure. Figure 3 is a detail perspective view of the rear follower member of the mechanism, said view being on an enlarged scale. Figure 4 is a plan view of the rubber shock absorbing unit illustrated in Figure 1, showing a pair of metal clips applied thereto to hold the unit compressed to facilitate assembling thereof with the other parts of the mechanism.

Our improved combined friction and rubber shock absorbing mechanism comprises broadly a friction casing A, a rear follower B, a set of three friction shoes C—C—C slidable within the casing, a wedge block D in wedging engagement with the shoes, coil springs E and F, a retainer bolt G anchoring the wedge block to the casing, a follower plate H bearing on the rear end of the casing, a series of rubber mats J—J—J—J, and a series of spacing plates K—K—K, the plates K being alternated with the mats J, the mats and plates together forming a rubber shock absorbing unit which is interposed between the follower plate H and the rear follower member B of the mechanism.

The friction casing A is in the form of a hollow, tubular member of hexagonal, transverse cross section. The casing is closed at its rear end by a transverse wall 10 which extends beyond the top and bottom sides of the casing, as seen in Figure 1, thus providing top and bottom stop flanges 11—11 at the rear end portion of the casing. The flanges 11—11 are reenforced by longitudinally extending, exterior guide webs 12—12 at the rear end portion of the casing, which are at the top and bottom sides thereof, as seen in Figure 2.

The rear follower B is in the form of a relatively thick plate, having forwardly projecting, top and bottom arms 25—25 extending beyond the flanges 11—11 and provided with inturned flanges 13—13 at their front ends, engaged in front of the flanges 11—11 of the casing A. The flanges 13—13 are cut out or recessed, as shown, to provide guide slots 14—14 accommodating the webs 12—12 of the casing, and restricting the follower B to movement lengthwise with respect to the casing.

The friction shoes C, which are three in number, are telescoped within the casing and are provided with longitudinally extending, V-shaped friction surfaces 15 in sliding engagement with longitudinally extending, V-shaped, interior friction surfaces 16 provided on the casing. Each shoe C has a flat wedge face 17 on its inner side.

The wedge D is in the form of a block having three flat wedge faces 18—18—18 at its inner end arranged symmetrically about the longitudinal central axis of the casing and engaging respectively with the wedge faces 17—17—17 of the shoes C—C—C.

The springs E and F are disposed within the casing A, each spring being in the form of a helical coil, and the spring F surrounding the spring E. The spring E has its front and rear ends bearing respectively on inset seats 19—19—19 at the inner ends of the shoes C—C—C, and an inwardly extending hollow boss 20 on the wall 10 of the casing. The spring F has its front and rear ends bearing respectively on the rear ends of the shoes C—C—C and the end wall 10 of the casing A.

The retainer bolt G is headed at its rear end, the head which is indicated by 21, being anchored to the boss 20. The front end of the bolt G is threaded and has a nut 22 screwed thereon. The wedge D is provided with a pocket 23 in which the nut 22 is accommodated, and an opening 24 leading to said pocket, through which the bolt extends. The nut 22 is shouldered against the inner end wall of the pocket 23 and limits outward movement of the wedge block. In the full release position of the mechanism shown in Figure 1, the wedge D projects outwardly beyond the outer end of the casing A. The wedge D is in engagement with and is actuated by the usual front follower plate (not shown) of the railway draft rigging.

The follower plate H, which is of substantially rectangular outline, is disposed between the arms 25—25 of the rear follower member B and bears on the rear end of the casing A, that is, on the wall 10 of said casing.

The rubber mats or pads J and the plates K, which together form a shock absorbing unit, are disposed between the rear follower B and the follower plate H, and are embraced by the arms 25—25 of the follower B, the plates being alternated with the mats or pads and forming spacing elements. The plates and mats are of substantially rectangular outline, and, as shown, the plates are preferably of greater size than the mats so that they project beyond the outer edges of the latter to protect the same from damage. The mats J are preferably vulcanized to the plates K. In the completely assembled condition of the mechanism, the rubber cushioning unit, comprising the rubber mats J and plates K, is held under a predetermined initial compression between the rear follower B and the follower plate H.

In assembling the mechanism, the springs E and F and friction shoes C—C—C are placed within the casing A, and the wedge block D engaged with the shoes. The bolt G is then applied and adjusted to bring the friction mechanism to a predetermined overall length and place said mechanism under initial compression. The rear follower B is then engaged with the casing A by first disposing the same alongside the casing A, positioned so that the flanges 13—13 thereof will clear the front ends of the webs 12—12 of the casing when the follower B is displaced laterally inwardly with respect to the casing. With the parts thus positioned, the follower B is moved laterally with respect to the casing to bring the guide slots 14—14 in alignment with the webs 12—12. After this has been done, the follower B is pulled backwardly until arrested by the flanges 13—13 thereof being engaged with the flanges 11—11 of the casing A. The follower plate H and the rubber cushioning unit, comprising the mats J and the spacing plates K, is then placed between the end of the casing A and the vertical main body portion of the rear follower B by entering the same edgewise between the arms 25—25 of said follower B, the rubber cushioning unit being maintained compressed to a predetermined extent during this operation to facilitate the placing of the same in the assembled position shown in Figure 1. The suitable means for holding the rubber cushioning unit so compressed is illustrated in Figure 4, and comprises a pair of metal clips 26—26. The clips 26—26 are of U-shaped, transverse cross section and thus present flanges which engage over the outer edge portions of the spacing plates K, at opposite end portions of the rubber cushioning unit. Before assembling the rubber cushioning unit with the other parts of the mechanism, this unit is compressed to such an extent between the pressure members of a power press that it may be freely inserted between the follower B and the follower plate H and will still be under a certain amount of compression when in the assembled position shown in Figure 1 and after removal of the clips 26—26. Before removal of the cushioning unit from the press, the clips 26—26 are applied to the spacing plates K—K of the rubber cushioning unit, as illustrated in Figure 4, to maintain the same under compression until the operation of assembling the same with the other parts of the mechanism has been completed.

The operation of our improved shock absorbing mechanism is as follows: During relative movement of the front follower of the usual draft rigging and the casing A toward each other, the wedge D is forced inwardly of the casing A, thereby wedging the shoes C—C—C apart and sliding the same inwardly on the friction surfaces of the casing against the resistance of the springs E and F. During this action, pressure is transmitted to the rubber unit comprising the rubber mats J and the spacing plates K, through the casing A, thereby also effecting some compression of this rubber unit. Upon further compression of the mechanism, the front follower comes into engagement with the front end of the casing A, whereby compression of the friction mechanism is limited.

We claim:

1. In a shock absorbing mechanism, the combination with a friction casing having laterally projecting stop flanges at its rear end; of lengthwise extending guide ribs on the rear end portion of said casing; friction shoes slidingly telescoped within the casing; a wedge in wedging engagement with the shoes; springs within the casing bearing on said shoes; a rear follower having forwardly extending arms embracing said casing on opposite sides and having flanges at their front ends engageable with the flanges of the casing to limit movement of said follower away from the casing, said flanges of said follower having guide slots within which said guide ribs are engaged; and a rubber cushioning unit interposed between said rear follower and rear end of the casing.

2. In a shock absorbing mechanism, the combination with a friction casing having laterally projecting stop flanges at its rear end; of lengthwise extending guide ribs on the rear end portion of said casing; friction shoes slidingly telescoped within the casing; a wedge in wedging engagement with the shoes; springs within the casing bearing on said shoes; a rear follower having forwardly extending arms embracing said casing on opposite sides and having flanges at their front ends engageable with the flanges of the casing to limit movement of said follower away from the casing, said flanges of said follower having guide slots within which said guide ribs are engaged; and a rubber cushioning unit interposed between said rear follower and rear end of the casing, said rubber unit including a series of rubber mats and a series of spacing plates, said plates being alternated with said mats.

References Cited in the file of this patent

UNITED STATES PATENTS

| Number | Name | Date |
|---|---|---|
| 1,298,778 | O'Connor | Apr. 1, 1919 |
| 1,364,511 | O'Connor | Jan. 4, 1921 |
| 1,684,510 | O'Connor | Sept. 18, 1928 |
| 2,187,156 | Johnson | Jan. 16, 1940 |
| 2,277,881 | Olander | Mar. 31, 1942 |
| 2,279,308 | Fuchs | Apr. 14, 1942 |